(12) United States Patent
Hummel

(10) Patent No.: US 11,089,636 B2
(45) Date of Patent: Aug. 10, 2021

(54) VEHICLE-BASED WIRELESS HOTSPOT MANAGEMENT

(71) Applicant: MOJ.IO INC., Vancouver (CA)

(72) Inventor: Markus Hummel, Los Altos Hills, CA (US)

(73) Assignee: MOJ.IO, Inc., Vancouver (CA)

( * ) Notice: Subject to any disclaimer, the term of this patent is extended or adjusted under 35 U.S.C. 154(b) by 833 days.

(21) Appl. No.: 15/891,313

(22) Filed: Feb. 7, 2018

(65) Prior Publication Data

US 2019/0246435 A1    Aug. 8, 2019

(51) Int. Cl.
| | |
|---|---|
| *H04W 76/10* | (2018.01) |
| *G06F 3/0484* | (2013.01) |
| *G07C 5/08* | (2006.01) |
| *H04Q 9/00* | (2006.01) |
| *H04W 84/18* | (2009.01) |
| *H04W 84/12* | (2009.01) |

(52) U.S. Cl.
CPC ........ *H04W 76/10* (2018.02); *G06F 3/04847* (2013.01); *G07C 5/085* (2013.01); *G07C 5/0808* (2013.01); *H04Q 9/00* (2013.01); *H04W 84/12* (2013.01); *H04W 84/18* (2013.01)

(58) Field of Classification Search
CPC ..... H04W 76/10; H04W 84/18; H04W 84/12; H04W 52/028; H04W 52/0254; G07C 5/085; G07C 5/0808; G06F 3/04847; H04Q 9/00; Y02D 30/70; H04L 67/12
See application file for complete search history.

(56) References Cited

U.S. PATENT DOCUMENTS

| | | | |
|---|---|---|---|
| 9,066,197 B2 * | 6/2015 | Kiukkonen | ......... H04W 12/003 |
| 9,520,006 B1 * | 12/2016 | Sankovsky | .............. G07C 5/02 |
| 10,173,486 B1 * | 1/2019 | Lee | ........................ B60D 1/64 |

(Continued)

OTHER PUBLICATIONS

"WiFi Automatic—WiFi Hotspot", Google Play Website, Available Online at https://play.google.com/store/apps/details?d=com.kimcy92. wifiautoconnect, Available as Early as Jun. 22, 2016, 3 pages.

(Continued)

*Primary Examiner* — Mussa A Shaawat
(74) *Attorney, Agent, or Firm* — Perspectives Law Group, Corp.

(57) ABSTRACT

A network connectivity mode is activated at a vehicle during which an on-board wireless LAN interface and an on-board wireless WAN interface are collectively operated in a higher-power consumption state with respect to a set of on-board batteries to collectively support communications between one or more LAN-side client devices and one or more WAN-side network resources. Operation of the vehicle entering a predefined operating state is detected, and in response thereto, the network connectivity mode is deactivated after a period of time during which the on-board wireless LAN interface and the on-board wireless WAN interface are collectively operated in a lower-power consumption state with respect to the set of on-board batteries and communications are discontinued between the one or more LAN-side client devices and the one or more WAN-side network resources via the on-board wireless LAN interface and the on-board wireless WAN interface.

20 Claims, 4 Drawing Sheets

(56) References Cited

U.S. PATENT DOCUMENTS

| | | | | |
|---|---|---|---|---|
| 2001/0051863 A1* | 12/2001 | Razavi | ................... | G01C 21/26 |
| | | | | 703/23 |
| 2014/0107886 A1* | 4/2014 | Miljkovic | ............ | G07C 5/0825 |
| | | | | 701/29.6 |
| 2014/0269649 A1* | 9/2014 | Lockerbie | ............. | H04W 88/16 |
| | | | | 370/338 |
| 2016/0189447 A1* | 6/2016 | Valenzuela | ......... | G06F 11/3058 |
| | | | | 701/29.6 |
| 2017/0019831 A1* | 1/2017 | Ady | ...................... | H04W 76/14 |
| 2017/0324817 A1* | 11/2017 | Oliveira | .................. | H04L 67/10 |
| 2018/0079322 A1* | 3/2018 | Tanriover | ............. | B60N 2/0248 |
| 2018/0337711 A1* | 11/2018 | Bilotta | .................. | H04W 16/26 |
| 2020/0107226 A1* | 4/2020 | Raleigh | ................ | H04W 28/10 |

OTHER PUBLICATIONS

"HotSpot Timer", Google Play Website, Available Online at https://play.google.com/store/apps/details?id=com.mibodev.hotspottimer&hl=en, Updated on Mar. 6, 2017, 2 pages.

"How to Make the Most of Your OnStar Wi-Fi Hotspot," Experience OnStar Website, Available Online at https://www.experienceonstar.com/view/how-to-make-the-most-of-your-onstar-wi-fi-hotspot, Mar. 6, 2017, 5 pages.

"You and Your Vehicle Have a Special Connection," Experience OnStar Website, Available Online at https://www.experienceonstar.com/view/your-vehicle-mobile-app, Mar. 17, 2017, 4 pages.

"OnStar Services," OnStar Website, Available Online at https://www.onstar.com/us/en/services/connections/4glte.html#wfti_hotspot, Available as Early as Jan. 13, 2018, 7 pages.

\* cited by examiner

VEHICLE-BASED WIRELESS HOTSPOT MANAGEMENT

BACKGROUND

A wireless hotspot incorporates a wireless access point and a wide area network gateway by which nearby wireless devices may obtain connectivity to a wide area network, such as the Internet or cellular networks. Devices typically connect to a wireless hotspot over a local area network or personal area network. A mobile wireless hotspot may be established by a mobile wireless computing device such as a laptop computer, smartphone, or a computing device integrated with a vehicle to provide connectivity to other nearby devices. Devices connecting to a wireless hotspot may benefit from the wide area network connectivity provided by the wireless hotspot by obtaining increased data rates for their connections to the wide area network and reduced power consumption for communicating with network resources of the wide area network.

SUMMARY

Management of a vehicle-based wireless hotspot is disclosed herein. In an example, a vehicle includes an on-board wireless local area network (LAN) interface providing wireless LAN connectivity to one or more LAN-side client devices, an on-board wireless wide area network (WAN) interface providing wireless WAN connectivity to one or more WAN-side network resources, and a set of one or more on-board batteries to supply electrical energy to the on-board wireless LAN interface and the on-board wireless WAN interface.

According to an example method performed at the vehicle, operation of the vehicle is monitored via one or more sensors located on-board the vehicle. A network connectivity mode is activated during which the on-board wireless LAN interface and the on-board wireless WAN interface are collectively operated in a higher-power consumption state with respect to the set of on-board batteries to collectively support communications between the one or more LAN-side client devices and the one or more WAN-side network resources via the on-board wireless LAN interface and the on-board wireless WAN interface. The network connectivity mode may be used by the LAN-side client devices to browse the Internet, post content to or retrieve content form web services, stream media content such as audio and video, and engage in email, text messaging, voice, or other forms of electronic communication.

Operation of the vehicle entering a predefined operating state (e.g., ignition-off, engine-off, parked, etc.) is detected, and in response thereto, the network connectivity mode is deactivated after a period of time following the operation of the vehicle entering the predefined operating state during which the on-board wireless LAN interface and the on-board wireless WAN interface are collectively operated in a lower-power consumption state with respect to the set of on-board batteries and communications are discontinued between the one or more LAN-side client devices and the one or more WAN-side network resources via the on-board wireless LAN interface and the on-board wireless WAN interface.

In an example, the disclosed method may be performed, at least in part, by a telematics device located on-board the vehicle that communicates with and receives electrical energy from an electronic system of the vehicle via an on-board diagnostics OBD interface. In another example, the disclosed method may be performed, at least in part, by a computing device integrated with the electronic system of the vehicle.

This summary includes only some of the concepts disclosed in greater detail by the following detailed description and associated drawings. As such, claimed subject matter is not limited to the contents of this summary.

DETAILED DESCRIPTION

Figure 1:
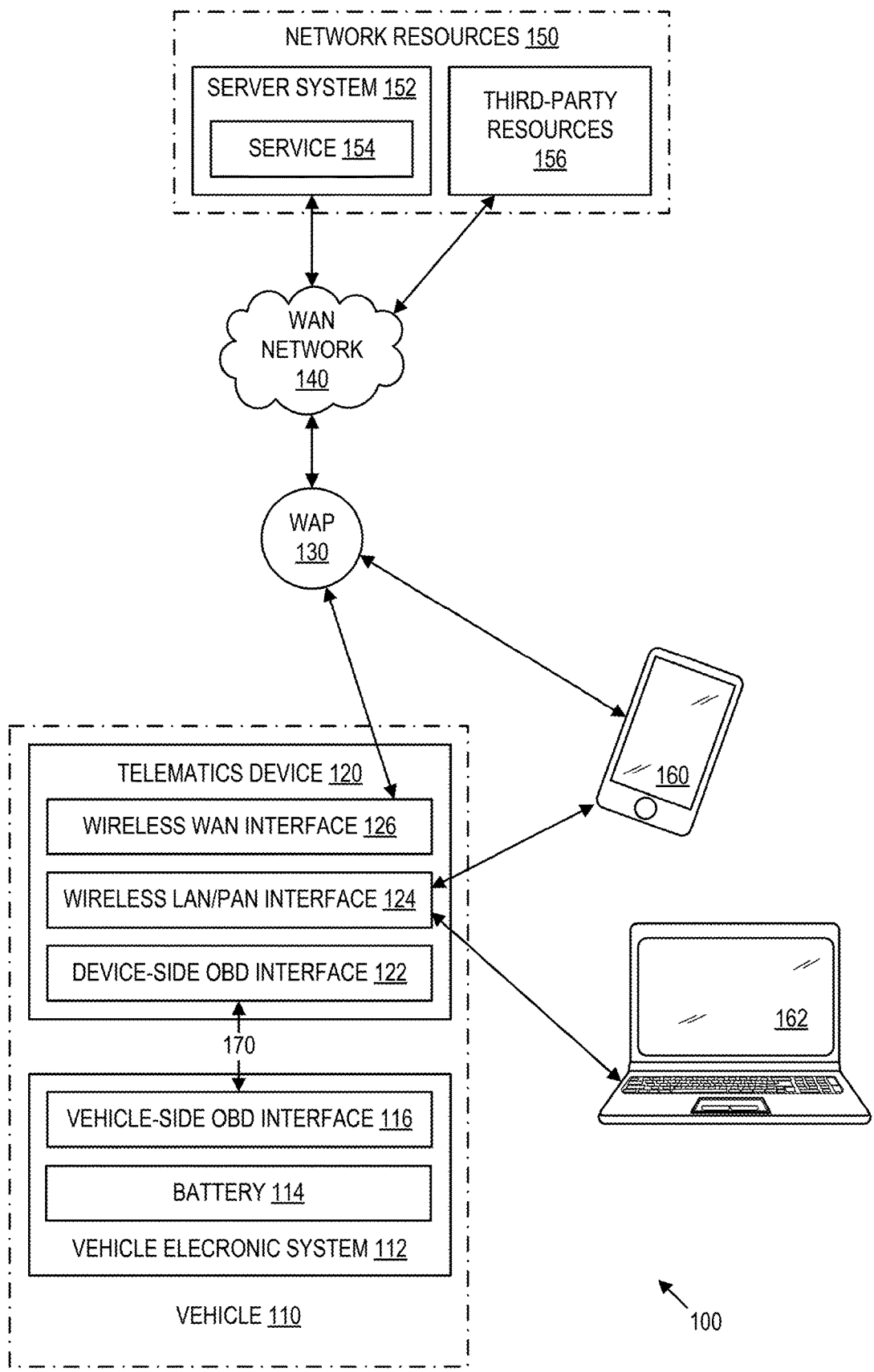
FIG. 1 is a schematic diagram depicting an example environment within which the disclosed management of a vehicle-based wireless hotspot may be implemented.

FIG. 1 depicts an example environment 100 within which the disclosed management of a vehicle-based wireless hotspot may be implemented. Within environment 100, a vehicle 110 is schematically depicted as including an associated vehicle electronic system 112. Vehicle 110 may take various forms, including road-legal vehicles, such as cars, trucks, and motorcycles. However, vehicle 110 may instead take other forms, including a wheeled or track-driven land-based vehicle, an aircraft, or a water-based vehicle.

Electronic system 112 refers to the integrated on-board electronic system of the vehicle and its various components, as described in further detail with reference to FIG. 4, for example. Electronic system 112 may include or otherwise interface with one or more batteries located on-board the vehicle, schematically depicted in FIG. 1 as battery 114. In at least some implementations, electronic system 112 includes a vehicle-side on-board diagnostics (OBD) interface 116.

FIG. 1 further depicts a telematics device 120 as being located on-board vehicle 110. Telematics device 120 includes a device-side OBD interface 122. Many modern vehicles, such as road-legal cars, trucks, motorcycles, etc. include on-board electronic systems that manage and record operation of the vehicle's various subsystems. On-board electronic systems may include or otherwise support OBD services that enable vehicle owners and repair technicians to access diagnostic information or other forms of operational information from the electronic system. As one example, on-board electronic systems may be accessed via vehicle-side OBD interface 116 in the form of a physical wired data link connector or data port, such as ALDL, OBD-I, OBD-1.5, OBD-II, or other suitable data interface.

Device-side OBD interface 122 of telematics device 120 may communicate with and/or receive electrical energy/ ground reference from electronic system 112 via vehicle-side OBD interface 116 over a link indicated schematically at 170. Such communications may be bi-directional, from telematics device 120 to electronic system 112, of from electronic system 112 to telematics device 120. Electronic system 112 may take the form of an on-board vehicle control system that manages and records operation of the vehicle's various subsystems. This on-board vehicle control system may include an on-board diagnostics subsystem via which telematics device 120 interacts with the vehicle control system. Interfaces 116, 122 may take the form of an OBD-compliant hardware-based data port, and link 170 may be implemented in accordance with an OBD protocol such as ALDL, OBD-I, OBD-1.5, OBD-II, as non-limiting examples. Communications may include OBD data transmitted by electronic system 112 to telematics device 120, which in turn may be processed and/or transmitted to a remote computing device over a wireless communications link. As another example, telematics device 120 may draw electrical energy and/or exchange ground reference from a set of one or more batteries (e.g., battery 114) of electronic system 112 to power components of telematics device 120. Additionally or alternatively, telematics device 120 may include its own power source, such as a battery. Examples of communications from telematics device 120 to electronic system 112 may include signals that initiate, activate, and/or deactivate one or more electronic functions at electronic system 112.

In at least some implementations, telematics device 120 may take the form of an aftermarket device that is installed by a vehicle owner, operator, or technician after purchase of the vehicle or at the time of purchase of the vehicle. In still other implementations, telematics device 120 may form part of and/or be integrated with electronic system 112. Telematics device 120 and electronic system 112 may collectively form an on-board computing system of the vehicle. In still other implementations, link 170 may take the form of a wireless communications link between interfaces 116, 122. Here, interfaces 116, 122 may include wireless transceivers, receivers, or transmitters, and associated electronic components providing one or more wireless communications protocols.

Telematics device 120 further includes a wireless local area network (LAN) interface 124 that serves as a wireless LAN access point. Throughout the present disclosure, LAN will be understood to also incorporate personal area network (PAN) technologies, such as Bluetooth, as a non-limiting example. Accordingly, wireless LAN interfaces should be construed to optionally include wireless PAN interfaces, both alone or in combination with true wireless LAN interfaces, such as Wi-Fi, for example. Telematics device 120 may selectively provide a wireless LAN to client devices via wireless LAN interface 124, in which case these client devices may be referred to as LAN-side clients. FIG. 1 depicts example LAN-side clients in the form of mobile client devices 160 and 162 that are each operable by a user. LAN-side clients may also include computing devices or computing systems integrated with the vehicle. Wireless LAN interface 124 may include one or more transceivers and other associated hardware/program logic that support wireless communications with LAN-side clients using any suitable wireless protocol, including Wi-Fi and Bluetooth, as non-limiting examples.

Telematics device 120 further includes a wireless wide area network (WAN) interface 126 that enables the telematics device to communicate wirelessly with a wireless access point (WAP) 130 that serves as an edge of a WAN network 140. Telematics device 120 may selectively connect to WAPs (e.g., WAP 130) to access network resources 150 over WAN network 140. WAN network 140 may include or otherwise take the form of the Internet or a portion thereof, including wired core networking infrastructure, wireless edge networking infrastructure, and backhaul networking infrastructure that collectively enable telematics device 120 to communicate with other devices connected to WAN network 140. For example, a server system 150 of one or more server devices connected to WAN network 140 may provide network resources in the form of a service 154 that may be accessed by telematics device 120. Other third-party network resources 156 are also depicted in FIG. 1. Communications between telematics device 120 and server system 152 (or other network resources) may be carried over a wireless communication link with WAP 130 that traverses WAN network 140 over wired and/or wireless communication links. Wireless WAN interface 126 may include one or more transceivers and other associated hardware/program logic that support wireless communications with WAPs such as WAP 130 using any suitable wireless protocol, including LTE 4G, 3G, Wi-Max, etc., as non-limiting examples. For example, wireless WAN interface 126 may include an associated SSID assigned by a cellular network. Communications within WAN network 140 may utilize TCP/IP protocols commonly associated with Internet traffic, as an example.

Under select conditions, telematics device 120 may provide WAN connectivity (referred to herein as a network connectivity mode) to LAN-side clients by serving as a gateway and wireless LAN access point by which the LAN-side clients can access WAN-side resources of WAN network 140, such as network resources 150. In this role, telematics device 120 may receive messages from LAN-side clients via wireless LAN interface 124 that are addressed to WAN-side network resources and may forward those messages onward to the WAN-side network resources by wirelessly transmitting those messages to a WAP of the WAN via wireless WAN interface 126. Additionally, in this role, telematics device 120 may receive messages from WAN-side network resources via wireless WAN interface 126 that are addressed to LAN-side clients and may forward those messages onward to the LAN-side clients by wirelessly transmitting those messages via wireless LAN interface 124.

While providing WAN connectivity to LAN-side clients, telematics device 120 may consume electrical energy resources from battery 114 of vehicle 110 via a link 170 established between interfaces 116 and 122. If the provision of WAN connectivity or other forms of network connectivity that consume the vehicle's electrical energy resources is not limited, insufficient electrical energy resources may be available to the vehicle's other electrical loads. For example, start-up of the vehicle may be impaired or precluded by insufficient electrical energy resources at the battery. In the case of electric or hybrid electric vehicles, vehicle range may be limited by insufficient electrical energy resources at the battery, thereby potentially stranding the vehicle occupants. Accordingly, the provision of WAN connectivity or other forms of network connectivity that consume the vehicle's electrical energy resources may be limited under select conditions as described in further detail herein, thereby reducing or eliminating scenarios in which insufficient electrical energy resources are available to the vehicle's other electrical loads.

Some LAN-side clients, such as example mobile device 160, may be configured for wireless WAN connectivity without the use of wireless interfaces located on-board the vehicle, such as wireless interfaces 124 and 126. For example, mobile device 160 may take the form of a mobile smartphone with a cellular wireless capability, enabling mobile device 160 to wirelessly connect directly to WAP 130 without traversing wireless interfaces 124 and 126. However, a user of mobile device 160 may still wish to obtain WAN connectivity via wireless interfaces 124 and 126 via a wireless LAN rather than a wireless WAN to conserve electrical energy resources of the mobile device. Other mobile devices, such as mobile device 162 which may take the form of a laptop computer, for example, may not be configured for WAN connectivity, thereby requiring a user of mobile device 162 to obtain WAN connectivity via wireless interfaces 124 and 126.

Figure 2:
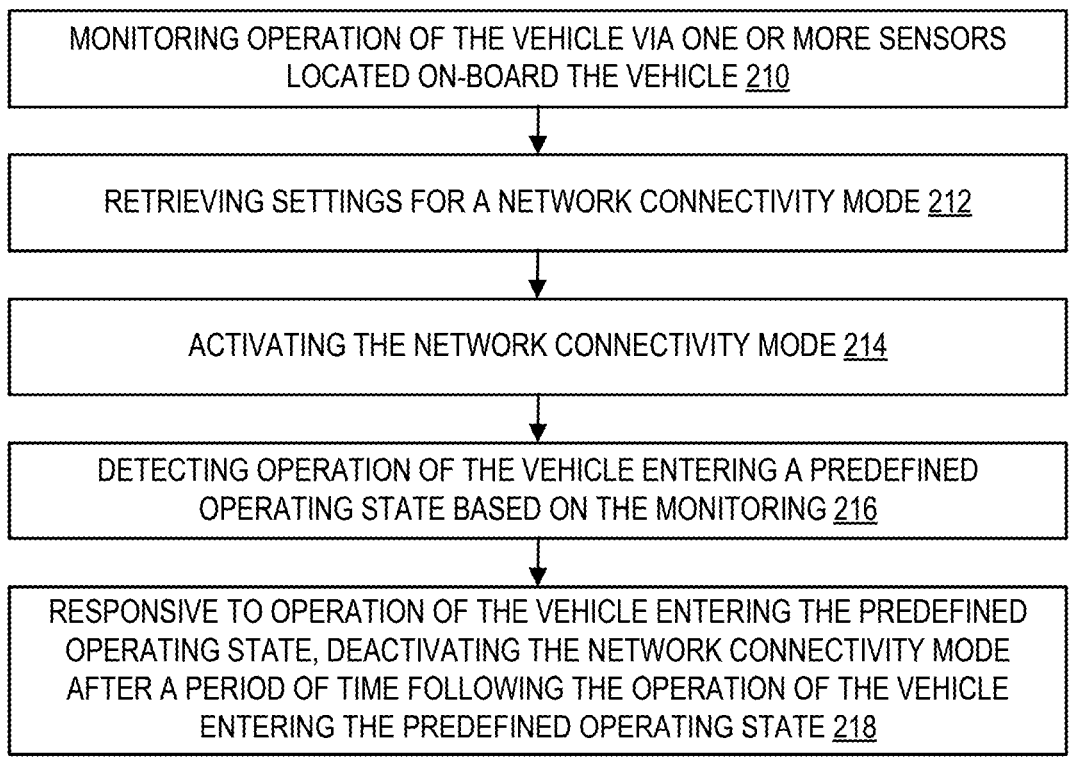
FIG. 2 is a flow diagram depicting an example method of managing a vehicle-based wireless hotspot.

FIG. 2 is a flow diagram depicting an example method of managing a vehicle-based wireless hotspot. Method 200 may be performed by a computing device or computing system located on-board a vehicle that forms part of a telematics device (e.g., telematics device 120) and/or a vehicle electronic system (e.g., vehicle electronic system 112). The vehicle may include (1) an on-board wireless local area network (LAN) interface providing wireless LAN connectivity to one or more LAN-side client devices, (2) an on-board wireless wide area network (WAN) interface providing wireless WAN connectivity to one or more WAN-side network resources, and (3) a set of one or more on-board batteries to supply electrical energy to the on-board wireless LAN interface and the on-board wireless WAN interface.

At 210, the method includes monitoring operation of the vehicle via one or more sensors located on-board the vehicle. In at least some implementations, monitoring operation of the vehicle includes receiving sensor data at a telematics device from the one or more sensors via an on-board diagnostics (OBD) interface of the vehicle, such as previously described with reference to FIG. 1. In these implementations, the on-board wireless LAN interface and the on-board wireless WAN interface may form part of the telematics device, and electrical energy may be supplied to one or more of the on-board wireless LAN interface and/or the on-board wireless WAN interface from the set of one or more batteries located on-board the vehicle via the OBD interface of the vehicle.

At 212, the method includes retrieving one or more settings for a network connectivity mode from a computer-readable storage device, which may be referred to herein a data store. The settings may be associated with one or more of a user identifier for a user, a vehicle identifier for the vehicle, and a device identifier for the telematics device in a database system of the data store. As part of operations 210, 212, or during an initialization operation, the method may further include obtaining a vehicle identifier of the vehicle (e.g., over the OBD interface), and selecting or otherwise set a predefined operating state and/or a period of time for deactivating a network connectivity mode based on the vehicle identifier, which may be then stored in computer-readable storage. For example, the vehicle identifier may be used to determine whether the vehicle includes a fuel combustion engine, whether the vehicle is an electric vehicle, whether the vehicle is a hybrid-electric vehicle, and/or a battery storage capacity of the vehicle, to name a few examples. The settings retrieved for the network connectivity mode may be based on the vehicle type. In at least some implementations, the predefined operating state and/or the period of time may be programmatically selected (e.g., using a look-up table or other suitable data structure) based on the vehicle type to account for differences in battery storage capacity and/or the ability to recharge the batteries using a fuel combustion engine on-board the vehicle, for example. As a non-limiting example, vehicles with large battery storage capacity may be at least initially set to a longer period of time following entry to the predefined operating state as compared to vehicles having smaller battery storage capacity. In at least some examples, the Vehicle identifier may take the form of a Vehicle Identification Number (VIN) of the vehicle obtained by receiving the VIN via the OBD interface of the vehicle, and local or remote data resources may be used to identify vehicle type based on the VIN. Alternatively or additionally, the predefined operating state and/or the period of time for deactivating the network connectivity mode may be user-defined, as described in further detail with reference to FIG. 3.

At 214, the method includes activating the network connectivity mode during which the on-board wireless LAN interface and the on-board wireless WAN interface are collectively operated in a higher-power consumption state with respect to the set of on-board batteries to collectively support communications between the one or more LAN-side client devices and the one or more WAN-side network resources via the on-board wireless LAN interface and the on-board wireless WAN interface. The network connectivity mode may be used by the LAN-side client devices, for example, to browse the Internet, post content to or retrieve content form web services, stream media content such as audio and video, and engage in email, text messaging, voice, or other forms of electronic communication.

At 216, the method includes detecting the operation of the vehicle entering a predefined operating state based on the monitoring performed at 210. The predefined operating state is one or more of: an engine-off state for a fuel combustion engine of the vehicle; an ignition-off state of the vehicle; a parked state for a transmission of the vehicle; a stationary state of the vehicle (e.g., as determined from GPS, speedometer, odometer, etc.); a battery depleting state of the set of one or more batteries of the vehicle in which the battery is losing electrical energy faster than it is being replaced; and/or charge state (i.e., level of electrical energy stored) for the set of one or more batteries of the vehicle, as non-limiting examples.

At 218, responsive to operation of the vehicle entering the predefined operating state, the method includes deactivating the network connectivity mode after a period of time following the operation of the vehicle entering the predefined operating state. Upon and during deactivation of the network connectivity mode, the on-board wireless LAN interface and the on-board wireless WAN interface are collectively operated in a lower-power consumption state with respect to the set of on-board batteries and communications are discontinued between the one or more LAN-side client devices and the one or more WAN-side network resources via the on-board wireless LAN interface and the on-board wireless WAN interface.

In at least some implementations, operation of the on-board wireless WAN and/or LAN interfaces may continue during deactivation of the network connectivity mode. For example, during deactivation of the network connectivity mode, the method may include periodically or intermittently transmitting data obtained from the one or more sensors located on-board the vehicle to a WAN-side network resource via the on-board wireless WAN interface, and/or periodically or intermittently requesting data from a WAN-side network resource via the on-board wireless WAN interface. As another example, during deactivation of the network connectivity mode, the method may include periodically or intermittently communicating with a first LAN-side client device of the one or more LAN-side client devices via the on-board wireless LAN interface, in which the first LAN-side client device is a primary LAN-side client device of a user designated as the primary user of the vehicle and/or telematics device.

Method 300 may further include as part of operation 210 and 214, detecting, based on the monitoring, the operation of the vehicle exiting the predefined operating state, and responsive to operation of the vehicle exiting the predefined operating state, reactivating the network connectivity mode.

Accordingly, the process flow of method 300 may return to operation 210 from operation 218, for example, responsive to ignition-on or removal from a parked state, etc. As another example, the process flow may return to operation 214 to activate the network connectivity mode responsive to a user pressing an activation button or user interface on the telematics device or the vehicle control panel (within the context of vehicle-integrated implementations), or pressing a graphical selector within a GUI presented by an application operating at a client device.

Figure 3:
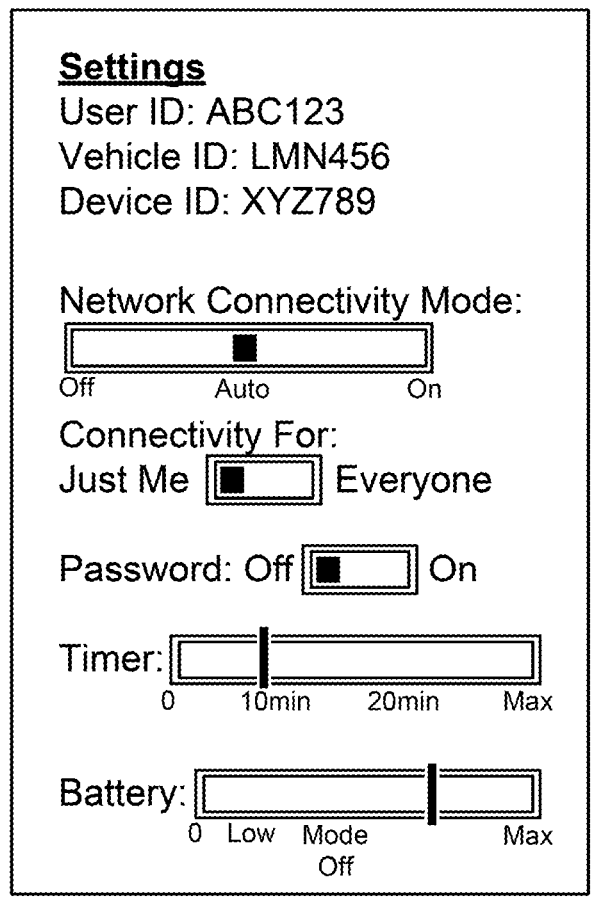
FIG. 3 is a schematic diagram depicting an example graphical user interface enabling a user to control management of a vehicle-based wireless hotspot.

FIG. 3 is a schematic diagram depicting an example graphical user interface (GUI) 300 enabling a user to control management of a vehicle-based wireless hotspot. GUI 300 may form part of an application operating at a user's computing device, and may be presented via a graphical display of the user's computing device, for example. The various settings depicted and described with reference to FIG. 3 may be used as input to a computer-executable management program or other suitable logic for managing a vehicle-based wireless hotspot in accordance with the methods and techniques disclosed herein. These settings may be stored at and retrieved from a computer-readable storage device located at one or more of: (1) on-board the vehicle (e.g., at the telematics device or electronic system of the vehicle), (2) at the computing device that presents GUI 300, and/or (3) at a cloud-based service (e.g., service 154 of FIG. 1).

GUI 300 includes a settings menu that shows a user identifier (User ID: ABC123) for the user, a vehicle identifier (Vehicle ID: LMN456) for the vehicle which may take the form of e.g., a Vehicle Identification Number (VIN) of the vehicle, and a device identifier (Device ID: XYZ789) for the telematics device connected to the electronic system of the vehicle. The settings may be specific to and associated with one or more of the user identifier, vehicle identifier, and device identifier to enable settings to vary among a population of vehicles, users, and telematics devices.

GUI 300 further includes a network connectivity mode setting that enables a user to manually turn the network connectivity mode on or off, or to set the network connectivity mode to automatic management in accordance with previously described method 200 and the predefined settings. As an example, GUI 300 may include a setting that enables a user to provide the network connectivity mode to only the user (Just Me) or to everyone that connects their LAN-side client device to the vehicle's wireless LAN interface. As another example, GUI 300 may include a setting that enables a user to turn a password requirement on or off for obtaining network access via the vehicle's wireless LAN interface. As another example, GUI 300 may include a setting that enables a user to define a timer value (e.g., 10 min, 20 min, 30, min, 1 hour, 2 hours, etc.) that corresponds to a period of time that the network connectivity mode remains activated following the operation of the vehicle entering the predefined operating state, as previously described at operation 218 of method 200. The timer value may alternatively be set by the user to zero minutes so that network connectivity mode is deactivated upon detecting operation of the vehicle entering the predefined operating state. Alternatively, the timer value may be set by the user to the maximum value that corresponds to a manufacturer-defined period of time or to a minimum threshold battery charge, for example.

GUI 300 may further include a battery state indicator that shows the current level of electrical energy stored at a set of one or more batteries located on-board the vehicle that supply power to the wireless WAN and/or LAN interfaces. Here, the currently set timer value may be reflected at the battery state indicator (e.g., as the Mode Off label) to provide the user with a visual indication of the estimated remaining energy remaining in the set of batteries when the period of time is reached to deactivate the network connectivity mode. The Low label of the battery state indicator may provide the user with a visual indication of a minimum level of electrical energy needed to perform a vehicle-based task, such as starting an engine of the vehicle or traveling a specified distance by operation of an electric motor (e.g., in the case of an electric or hybrid-electric vehicle). In at least some implementations, the battery state indicator may be operable by the user to cause a corresponding change to the timer value.

Figure 4:
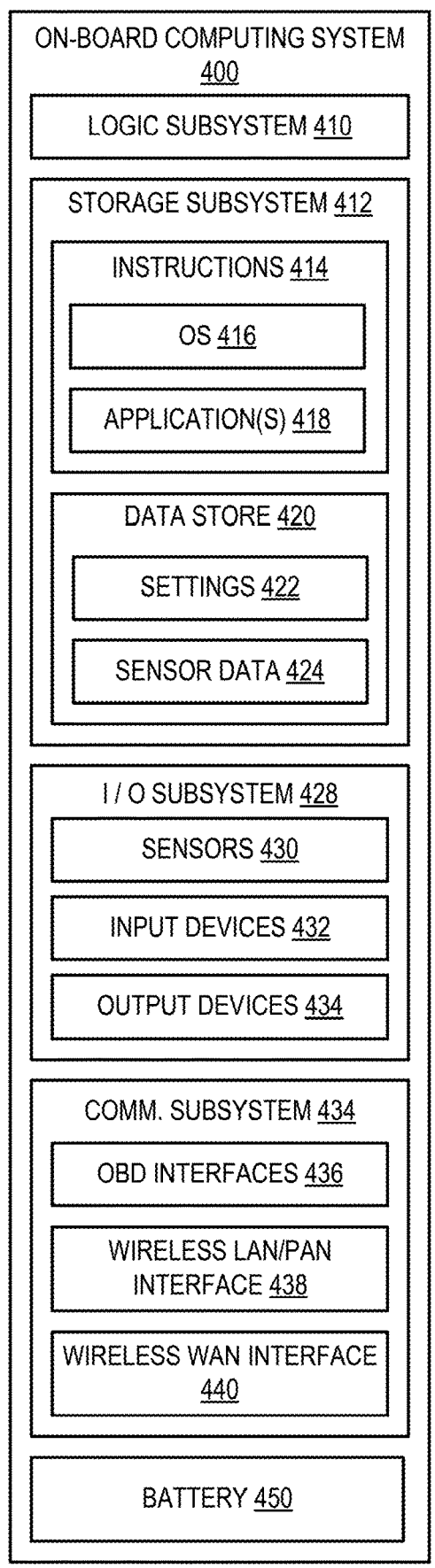
FIG. 4 is a schematic diagram depicting an example computing system located on-board a vehicle.

FIG. 4 is a schematic diagram depicting an example computing system located on-board a vehicle. Computing system 400 may perform the various methods and operations disclosed herein. Computing system 400 may take various forms, including (1) a telematics device that interfaces with an integrated electronic system of a vehicle, (2) an integrated electronic system of a vehicle having components and functionality of the disclosed telematics device integrated therewith, or (3) a combination of a telematics device and an integrated electronic system that interfaces with the telematics device. Accordingly, computing system may include integrated and/or after-market components with respect to a vehicle.

Computing system 400 is shown in FIG. 4 simplified form. It is to be understood that virtually any computer architecture may be used without departing from the scope of this disclosure. Computing system 400 includes a logic subsystem 410 and a data storage subsystem 412. Computing system 400 may further include an input/output subsystem 428, a communication subsystem 434, and an energy storage device that supplies electrical energy to the various components of on-board computing system 400, which may include a set of one or more batteries depicted as battery 450, among other suitable components.

Logic subsystem 410 may include one or more physical devices configured to execute instructions, such as example instructions 414 held in storage subsystem 412. For example, the logic subsystem may be configured to execute instructions that are part of one or more applications, services, programs, routines, libraries, objects, components, data structures, or other logical constructs. As a non-limiting example, instructions 414 in FIG. 4 include an operating system 416 and one or more applications 418. Such instructions may be implemented to perform a task, implement a data type, transform the state of one or more devices, or otherwise arrive at a desired result. As one example, the logic subsystem includes hardware in the form of one or more processors that are configured to execute software instructions. Additionally or alternatively, the logic subsystem may include one or more hardware or firmware logic machines configured to execute hardware or firmware instructions, as another example. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 412 includes one or more physical, non-transitory, machines or devices configured to hold data in data store 420 and/or instructions 414 executable by the logic subsystem to implement the herein described methods and operations. When such methods and operations are implemented, the state of storage subsystem 412 may be transformed (e.g., to hold different data or other suitable forms of information). Data store 420 is depicted as including settings 422 and sensor data 424. Settings 422 may correspond to stored settings data pre-defined by a manufacturer and/or a user (e.g., via GUI 300 of FIG. 3). Sensor data 424 may include measurement data obtain from one or more sensors located on-board the vehicle and/or processed forms of such measurement data. Sensor data 424 may indicate an operating state of the vehicle, enabling operation of the vehicle to be monitored as described herein.

Storage subsystem 812 may include removable media and/or built-in devices. Storage subsystem 412 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 412 may include devices with one or more of the following characteristics: volatile, nonvolatile, dynamic, static, read/write, read-only, random access, sequential access, location addressable, file addressable, and content addressable. In at least some implementations, logic subsystem 410 and storage subsystem 412 may be integrated into one or more common devices, such as an application specific integrated circuit or a system on a chip. It is to be appreciated that storage subsystem 412 includes one or more physical, non-transitory devices. In contrast, in at least some implementations and under select operating conditions, aspects of the instructions described herein may be propagated in a transitory fashion by a signal (e.g., an electromagnetic signal, an optical signal, etc.) that is not held by a physical device for at least a finite duration. Furthermore, data and/or other forms of information pertaining to the present disclosure may be propagated by a signal.

The terms "module" or "program" may be used to describe an aspect of a computing system that is implemented to perform one or more particular functions. In some cases, such a module or program may be instantiated via logic subsystem 410 executing instructions held by storage subsystem 412. It is to be understood that different modules or programs may be instantiated from the same application, service, code block, object, library, routine, API, function, etc. Likewise, the same module or program may be instantiated by different applications, services, code blocks, objects, routines, APIs, functions, etc. The terms "module" or "program" are meant to encompass individual or groups of executable files, data files, libraries, drivers, scripts, database records, etc.

Input/output subsystem 428 may include and/or otherwise interface with one or more sensors 430, input devices 432, and/or output devices 434. Examples of input devices include a dedicated button or switch, keyboard, keypad, touch-sensitive graphical display device, touch-panel or pad, a computer mouse, a pointer device, a handheld controller, a microphone, etc. Examples of output devices include a graphical display device, a touch-sensitive graphical display device, an audio speaker, a haptic feedback device (e.g., a vibration motor), etc. When included, a graphical display device may be used to present a visual representation of data held by storage subsystem 412, such as GUI 300, for example. As the herein described methods and operations change the data held by the storage subsystem, and thus transform the state of the storage subsystem, the state of the graphical display may likewise be transformed to visually represent changes in the underlying data.

Communication subsystem 434 may be configured to communicatively couple computing system 400 with one or more other computing devices or computing systems, and/or to communicatively couple two or more computing devices that form computing system 400. Communication subsystem 434 may include wired and/or wireless communication devices compatible with one or more different communication protocols. As an example, the communication subsystem may be configured for communication via a wireless telephone network, a wireless local area network, a wired local area network, a wireless personal area network, a wired personal area network, a wireless wide area network, a wired wide area network, etc. In at least some implementations, the communication subsystem may enable computing system 400 to send and/or receive messages to and/or from other devices via a communications network such as the Internet, for example. Communication subsystem 434 is depicted in FIG. 4 as including OBD interfaces 436 which may correspond to a vehicle-side OBD interface and/or a device-side OBD interface as described, for example, with reference to FIG. 1. Communication subsystem 434 is further depicted in FIG. 4 as including a wireless LAN interface 438 and a wireless WAN interface 440.

It is to be appreciated that a "service", as used herein, may be an application program or other suitable instruction set executable across multiple sessions and available to one or more system components, programs, and/or other services. FIG. 1 depicts a non-limiting example of a service 154. In at least some implementations, a service may run on a server or collection of servers responsive to a request from a client (e.g., an on-board computing system, a wireless mobile device, or other networked computing device). A service may be configured for use with one or more applications that may be distributed to and downloaded by one or more other computing devices. For example, one or more mobile computing devices, telematics devices, server devices, etc. may download application programs to augment the user experience provided by or through a computing system located on-board a vehicle. In at least some implementations, a service may host or otherwise provide an application program store or library from which application programs may be purchased or obtained by subscribers or members of the public. A service may include one or more service modules for providing cloud-based functionality. For example, a notification module may receive, process, and forward event notifications and response messages between telematics devices and client devices. As another example, an account module may associate profile information or other data with various identifiers, and enable other computing devices, such as on-board computing systems and/or client devices to access account profile information via an application programming interface (API). As yet another example, an application module may distribute and/or manage application programs operating at on-board computing systems and/or client devices. Application module may support the ability for users to port applications, data, and/or preferences stored in a user account across multiple on-board computing systems.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and sub-combinations of the various processes, systems and configurations, and other features, functions, acts, and/or properties disclosed herein, as well as any and all equivalents thereof. It should be understood that the disclosed embodiments are illustrative and not restrictive. Variations to the disclosed embodiments that fall within the metes and bounds of the claims, now or later presented, or the equivalence of such metes and bounds are embraced by the claims.

The invention claimed is:

1. A method of managing a vehicle-based wireless hotspot, the method comprising:
   at a vehicle that includes:
      an on-board wireless local area network (LAN) interface providing wireless LAN connectivity to one or more LAN-side client devices,
      an on-board wireless wide area network (WAN) interface providing wireless WAN connectivity to one or more WAN-side network resources, and
      a set of one or more on-board batteries to supply electrical energy to the on-board wireless LAN interface and the on-board wireless WAN interface, coupled through an on-board diagnostic (OBD) interface:
         monitoring operation of the vehicle via one or more sensors, located on-board the vehicle, through the OBD interface, including OBD data configured for transmitting to a remote computing device;
         activating a network connectivity mode during which the on-board wireless LAN interface and the on-board wireless WAN interface are collectively operated in a higher-power consumption state with respect to the set of on-board batteries to collectively support communications between the one or more LAN-side client devices and the one or more WAN-side network resources via the on-board wireless LAN interface and the on-board wireless WAN interface;
         detecting, based on the monitoring, the operation of the vehicle entering a predefined operating state; and
         responsive to operation of the vehicle entering the predefined operating state, deactivating the network connectivity mode after a period of time following the operation of the vehicle entering the predefined operating state during which the on-board wireless LAN interface and the on-board wireless WAN interface are collectively operated in a lower-power consumption state with respect to the set of on-board batteries and communications are discontinued between the one or more LAN-side client devices and the one or more WAN-side network resources via the on-board wireless LAN interface and the on-board wireless WAN interface.

2. The method of claim 1, wherein the predefined operating state includes an engine-off state for a fuel combustion engine of the vehicle.

3. The method of claim 1, wherein the predefined operating state includes an ignition-off state of the vehicle.

4. The method of claim 1, wherein the predefined operating state includes a parked state for a transmission of the vehicle.

5. The method of claim 1, wherein the predefined operating state includes a stationary state of the vehicle.

6. The method of claim 1, wherein the predefined operating state includes one or more of a charge state for the set of one or more batteries of the vehicle and/or a battery depleting state of the set of one or more batteries of the vehicle.

7. The method of claim 1, further comprising:
   obtaining a vehicle identifier of the vehicle; and
   selecting the predefined operating state for the vehicle based on the vehicle identifier.

8. The method of claim 7, wherein the vehicle identifier is a VIN of the vehicle obtained by receiving the VIN via the on-board diagnostics (OBD) interface.

9. The method of claim 1, further comprising:
   obtaining a vehicle identifier of the vehicle; and
   setting the period of time for deactivating the network connectivity mode based on the vehicle identifier.

10. The method of claim 1, wherein the period of time for deactivating the network connectivity mode is user-defined; and
   wherein the method further comprises retrieving settings previously defined by a user for the network connectivity mode from a computer-readable storage device.

11. The method of claim 1, further comprising:
   detecting, based on the monitoring, the operation of the vehicle exiting the predefined operating state; and
   responsive to operation of the vehicle exiting the predefined operating state, reactivating the network connectivity mode.

12. The method of claim 1, wherein during deactivation of the network connectivity mode, periodically or intermittently transmitting data obtained from the one or more sensors located on-board the vehicle to a WAN-side network resource via the on-board wireless WAN interface, and/or periodically or intermittently requesting data from a WAN-side network resource via the on-board wireless WAN interface.

13. The method of claim 1, wherein during deactivation of the network connectivity mode, periodically or intermittently communicating with a first LAN-side client device of the one or more LAN-side client devices via the on-board wireless LAN interface.

14. The method of claim 13, wherein the first LAN-side client device is a primary LAN-side client device of a user designated as the primary user of the vehicle.

15. The method of claim 1, wherein monitoring operation of the vehicle includes receiving sensor data at a telematics device from the one or more sensors via the on-board diagnostics (OBD) interface of the vehicle.

16. The method of claim 15, wherein the on-board wireless LAN interface and the on-board wireless WAN interface form part of the telematics device; and
   wherein electrical energy is supplied to the on-board wireless LAN interface and the on-board wireless WAN interface from the set of one or more batteries via the OBD interface of the vehicle.

17. A computing system for managing a vehicle-based wireless hotspot, the computing system comprising:
   a wireless local area network (LAN) interface located on-board the vehicle providing wireless LAN connectivity to one or more LAN-side client devices;
   a wireless wide area network (WAN) interface located on-board the providing wireless WAN connectivity to one or more WAN-side network resources;

one or more computing devices programmed with instructions executable by the one or more computing devices to:

monitor operation of the vehicle via one or more sensors, located on-board the vehicle, accessed through an on-board diagnostic (OBD) interface, including OBD data configured for transmitting to a remote computing device;

activate a network connectivity mode during which the wireless LAN interface and the wireless WAN interface are collectively operated in a higher-power consumption state with respect to electrical energy supplied from a set of one or more batteries located on-board the vehicle to collectively support communications between the one or more LAN-side client devices and the one or more WAN-side network resources via the wireless LAN interface and the wireless WAN interface;

detecting, based on the monitoring, the operation of the vehicle entering a predefined operating state; and responsive to operation of the vehicle entering the predefined operating state, deactivating the network connectivity mode after a period of time following the operation of the vehicle entering the predefined operating state during which the wireless LAN interface and the wireless WAN interface are collectively operated in a lower-power consumption state with respect to electrical energy supplied from the set of one or more batteries and communications are discontinued between the one or more LAN-side client devices and the one or more WAN-side network resources via the wireless LAN interface and the wireless WAN interface.

18. The computing system of claim 17, wherein the predefined operating state is one or more of:
an engine-off state for a fuel combustion engine of the vehicle;
an ignition-off state of the vehicle;
a parked state for a transmission of the vehicle;
a stationary state of the vehicle;
a battery depleting state of the set of one or more batteries of the vehicle.

19. A telematics device for managing a vehicle-based wireless hotspot, the telematics device comprising:
an on-board diagnostics (OBD) interface to receive data and electrical energy from a corresponding OBD interface of a vehicle;
a wireless local area network (LAN) interface providing wireless LAN connectivity to one or more LAN-side client devices;
a wireless wide area network (WAN) interface providing wireless WAN connectivity to one or more WAN-side network resources;
one or more computing devices programmed with instructions executable by the one or more computing devices to:

monitor operation of the vehicle over the OBD interface via one or more sensors, located on-board the vehicle, through the OBD interface, including OBD data configured for transmitting to a remote computing device;

activate a network connectivity mode during which the wireless LAN interface and the wireless WAN interface are collectively operated in a higher-power consumption state with respect to electrical energy supplied over the OBD interface from a set of one or more batteries located on-board the vehicle to collectively support communications between the one or more LAN-side client devices and the one or more WAN-side network resources via the wireless LAN interface and the wireless WAN interface;

detecting, based on the monitoring, the operation of the vehicle entering a predefined operating state; and responsive to operation of the vehicle entering the predefined operating state, deactivating the network connectivity mode after a period of time following the operation of the vehicle entering the predefined operating state during which the wireless LAN interface and the wireless WAN interface are collectively operated in a lower-power consumption state with respect to electrical energy supplied over the OBD interface from the set of one or more batteries and communications are discontinued between the one or more LAN-side client devices and the one or more WAN-side network resources via the wireless LAN interface and the wireless WAN interface.

20. The telematics device of claim 19, wherein the predefined operating state includes one or more of:
an engine-off state for a fuel combustion engine of the vehicle;
an ignition-off state of the vehicle;
a parked state for a transmission of the vehicle;
a stationary state of the vehicle;
a battery depleting state of the set of one or more batteries of the vehicle.

* * * * *